United States Patent
Sai (10) Patent No.: US 12,096,299 B2
(45) Date of Patent: Sep. 17, 2024

(54) COMMUNICATION CONTROL DEVICE, COMMUNICATION SYSTEM, COMPUTER-READABLE STORAGE MEDIUM AND COMMUNICATION CONTROL METHOD

(71) Applicant: SOFTBANK CORP., Tokyo (JP)

(72) Inventor: Jutatsu Sai, Kanagawa (JP)

(73) Assignee: SoftBank Corp., Tokyo (JP)

( * ) Notice: Subject to any disclaimer, the term of this patent is extended or adjusted under 35 U.S.C. 154(b) by 451 days.

(21) Appl. No.: 17/489,704

(22) Filed: Sep. 29, 2021

(65) Prior Publication Data
US 2022/0022119 A1 Jan. 20, 2022

Related U.S. Application Data

(63) Continuation of application No. PCT/JP2020/002813, filed on Jan. 27, 2020.

(30) Foreign Application Priority Data

Apr. 1, 2019 (JP) .................................. 2019-069956

(51) Int. Cl.
*H04W 36/24* (2009.01)
*H04B 7/185* (2006.01)
(Continued)

(52) U.S. Cl.
CPC ............ *H04W 36/24* (2013.01); *H04B 7/185* (2013.01); *H04W 16/28* (2013.01); *H04W 36/00835* (2018.08); *H04W 36/04* (2013.01)

(58) Field of Classification Search
CPC .................. H04W 36/24; H04W 16/18; H04W 36/00835; H04W 36/083
See application file for complete search history.

(56) References Cited

U.S. PATENT DOCUMENTS

| 5,867,765 A | 2/1999 | Nilsson |
| 2011/0183672 A1 | 7/2011 | Jeong |

(Continued)

FOREIGN PATENT DOCUMENTS

| JP | H1066138 A | 3/1998 |
| JP | H11502985 A | 3/1999 |

(Continued)

OTHER PUBLICATIONS

Office Action issued for counterpart Japanese Application No. 2019-069956, issued by the Japan Patent Office on Jun. 7, 2022 (drafted on Jun. 2, 2022).

(Continued)

*Primary Examiner* — Barry W Taylor (57) ABSTRACT

Provided is a communication control apparatus for controlling communication of a flying body for forming a cell by irradiating a beam toward the ground to provide wireless communication service for a user terminal in the cell. The communication control apparatus comprises: a determination unit for determining a user terminal of an offload target to be offloaded and a cell of an offload destination, based on a neighbor cell list of the cell of the flying body, a frequency priority list in which priorities are each associated with each of a plurality of frequencies, a radio resource usage rate of each of the plurality of user terminals that exists in the cell of the flying body, and an MCS of each of the plurality of user terminals; and a control unit for causing the user terminal of the offload target to be handed over to the cell of the offload destination.

20 Claims, 7 Drawing Sheets

(51) Int. Cl.
*H04W 16/28* (2009.01)
*H04W 36/00* (2009.01)
*H04W 36/04* (2009.01)

(56) References Cited

U.S. PATENT DOCUMENTS

| | | | |
|---|---|---|---|
| 2018/0054757 A1 | 2/2018 | Nanri | |
| 2018/0368034 A1 | 12/2018 | Lin | |
| 2023/0180072 A1* | 6/2023 | Ranjan | H04W 48/18 455/436 |
| 2023/0403585 A1* | 12/2023 | Ryu | H04B 7/18545 |

FOREIGN PATENT DOCUMENTS

| | | | |
|---|---|---|---|
| JP | 2002211496 A | 7/2002 | |
| JP | 2004088654 A | 3/2004 | |
| JP | 2014112935 A | 6/2014 | |
| JP | 2014192787 A | 10/2014 | |
| JP | 2015005872 A | 1/2015 | |
| JP | 2018032988 A | 3/2018 | |
| WO | 2017126013 A1 | 7/2017 | |
| WO | 2018052744 A2 | 3/2018 | |

OTHER PUBLICATIONS

International Preliminary Report on Patentability for International Application No. PCT/JP2020/002813, issued by the International Bureau of WIPO on Sep. 28, 2021.
Che Hong et al., "Handover with QoS support issues in integrated HAP-Satellite network", QSHINE 2007 Workshop: Satellite/Terrestrial Interworking ON, IWSTI '07, [Online] Aug. 14, 2007 (Aug. 14, 2007), pp. 1-7, XP055910555, New York, New York, USA DOI: 10. 1145/1577776. 1577779 ISBN: 978-1-59593-842-8.
Extended European Search Report for European Patent Application No. 20784838.3, issued by the European Patent Office on Apr. 21, 2022.

* cited by examiner

COMMUNICATION CONTROL DEVICE, COMMUNICATION SYSTEM, COMPUTER-READABLE STORAGE MEDIUM AND COMMUNICATION CONTROL METHOD

The contents of the following Japanese patent application(s) are incorporated herein by reference:
NO. 2019-069956 filed in JP on Apr. 1, 2019
NO. PCT/JP2020/002813 filed in WO on Jan. 27, 2020

BACKGROUND

1. Technical Field

The present invention relates to a communication control apparatus, a communication system, a computer-readable storage medium and a communication control method.

2. Related Art

Known is a flying body that includes an antenna and flies in the stratosphere, so as to provide a stratosphere platform (for example, refer to Patent Document 1).

CITATION LIST

Patent Document

Patent Document 1: Japanese Patent Application Publication No. 2002-211496

DESCRIPTION OF EXEMPLARY EMBODIMENTS

When providing wireless communication service for a plurality of user terminals, like a stratosphere platform, it is preferable to provide technology capable of suppressing lowering in communication quality due to tightness of a wireless resource.

Hereinafter, the present invention will be described through embodiments of the invention. However, the following embodiments do not limit the invention defined in the claims. Also, all combinations of features described in the embodiments are not necessarily essential to solutions of the invention.

Figure 1:
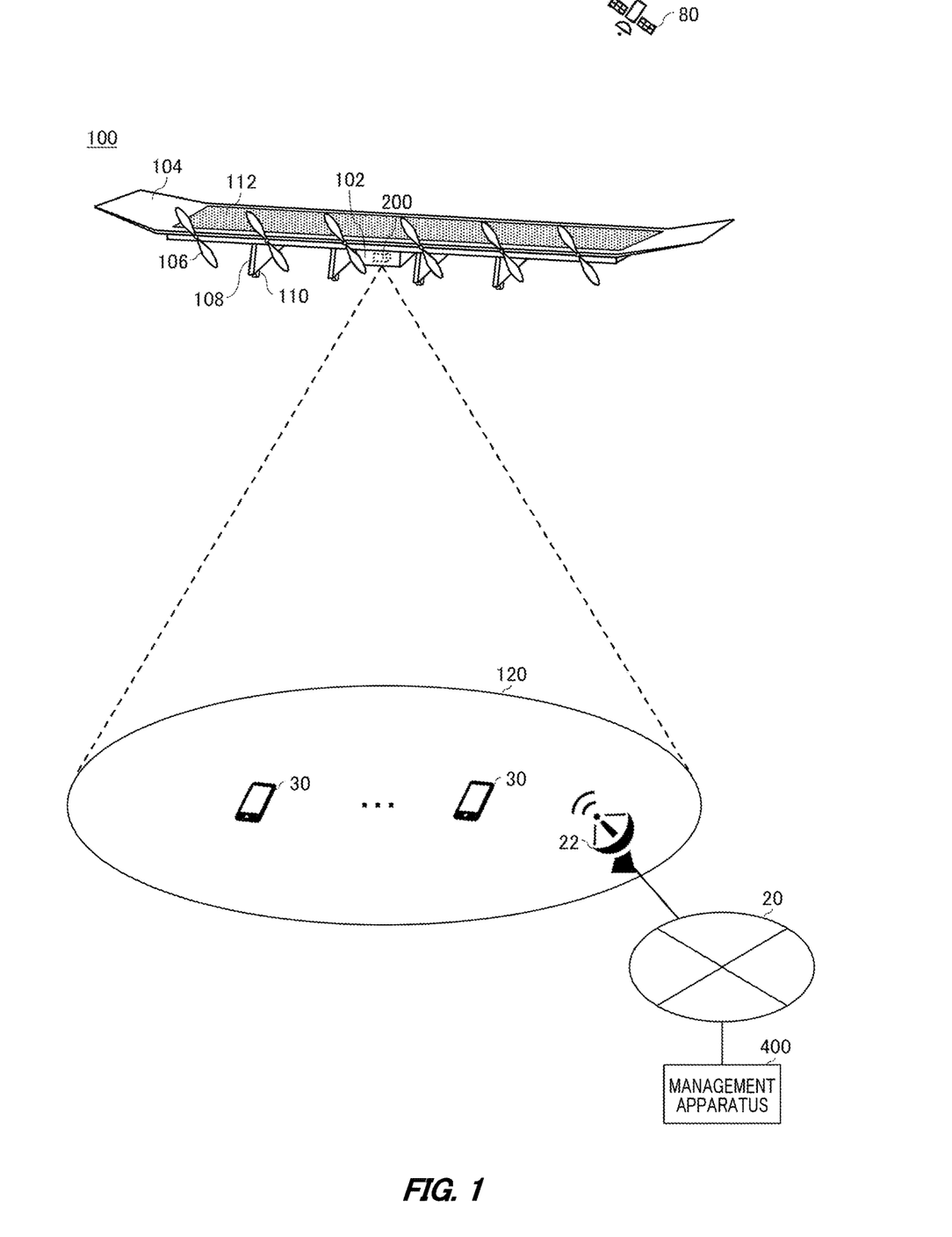
FIG. 1 schematically shows an example of a flying body 100.

FIG. 1 schematically shows an example of a flying body 100. The flying body 100 includes a main body 102, a main wing 104, a propeller 106, a skid 108, a wheel 110 and a solar cell panel 112.

The main body 102 includes a battery, a flying control apparatus, and a base station apparatus, which are not shown, and a communication control apparatus 200. The battery is configured to store electric power generated by the solar cell panel 112. The flying control apparatus is configured to control flying of the flying body 100. The flying control apparatus is configured to cause the flying body 100 to fly by rotating the propellers 106 with the electric power stored in the battery, for example. The base station apparatus has an antenna and is configured to form a cell 120 by irradiating a beam toward the ground by using the antenna, thereby providing wireless communication service for a user terminal 30 in the cell 120. The communication control apparatus 200 is configured to control communication by the base station apparatus. The communication control apparatus 200 and the base station apparatus may be integrally formed. In addition, the communication control apparatus 200, the base station apparatus and the flying control apparatus may be integrally formed.

The flying body 100 is configured to fly in the stratosphere to provide wireless communication service for the user terminal 30 on the ground, for example. The flying body 100 may function as a stratosphere platform.

The user terminal 30 may be any terminal as long as it is a communication terminal capable of communicating with the flying body 100. For example, the user terminal 30 is a mobile phone such as a smart phone. The user terminal 30 may also be a tablet terminal, a PC (Personal Computer) and the like. The user terminal 30 may also be a so-called IoT (Internet of Thing) device. The user terminal 30 may include all things corresponding to a so-called IoE (Internet of Everything).

The flying body 100 is configured to cover the entire ground area by moving over the ground area while covering a part of the ground area of a cover target by the multi-cell 120 example. The flying body 100 may also be configured to cover the ground area of a cover target by the cell 120 while circling over the ground area, for example.

The flying body 100 is configured to provide wireless communication service for the user terminal 30 by relaying communication between the user terminal 30 and a network 20 on the ground, for example. The network 20 may include a core network that is provided by a communication carrier. The core network may comply with any mobile communication system, and for example, complies with a 3G (3rd Generation) communication system, an LTE (Long Term Evolution) communication system, a 4G (4th Generation) communication system, and a 5G (5th Generation) communication system and subsequent mobile communication systems. The network 20 may include the Internet.

The flying body 100 is configured to communicate with the network 20 on the ground via a gateway 22 in the cell 120 among gateways 22 arranged in each region on the ground, for example. The flying body 100 is also configured to communicate with the network 20 via a communication satellite 80, for example. In this case, the flying body 100 has an antenna for communicating with the communication satellite 80.

The flying body 100 is configured to transmit data received from the user terminal 30 in the cell 120 to the network 20, for example. When the flying body 100 receives data addressed to the user terminal 30 in the cell 120 via the network 20, for example, the flying body 100 transmits the data to the user terminal 30.

The flying body 100 may be configured to communicate with another flying body. The flying body 100 is configured to communicate with another flying body via the network 20, for example. The flying body 100 is also configured to communicate with another flying body via the communication satellite 80, for example. The flying body 100 may be configured to directly communicate with another flying body via wireless communication. In this case, the flying body 100 has an antenna for wirelessly communicating with another flying body. The flying body 100 may be configured to form a C2 link with another flying body by using the antenna, and to perform communication via the C2 link, for example.

The flying body 100 may also be controlled by a management apparatus 400 on the ground. The flying body 100 is configured to fly or to form the multi-cell 120, according to an instruction transmitted via the network 20 and the gateway 22 by the management apparatus 400, for example. The management apparatus 400 may be configured to transmit an instruction to the flying body 100 via the communication satellite 80.

The management apparatus 400 is configured to control the flying body 100 by transmitting an instruction. The management apparatus 400 may be configured to cause the flying body 100 to fly over a target area on the ground so as to cover the target area by the cell 120.

The management apparatus 400 may be configured to manage ground area-related information relating to a ground area that the flying body 100 covers by the cell 120. The ground area-related information includes, for example, a holding situation of an event such as a concert at which many people can gather, in the ground area. The ground area-related information may also include an arrangement situation of mobile networks on the ground in the ground area. The ground area-related information may also include a communication situation of mobile networks on the ground. For example, the ground area-related information includes a communication load situation of mobile networks on the ground. The communication load situation may be, for example, a communication traffic situation. The communication load situation may also be, for example, a PRB (Physical Resource Block) usage rate. PRB may be an example of a radio resource.

The cell 120 that is formed by the flying body 100 can cover a very wide ground area, as compared to a cell that is formed by a wireless base station in mobile networks on the ground. For this reason, the number of the user terminals 30 that are accommodated by the flying body 100 may be much larger than the number of the user terminals 30 that are accommodated by the wireless base station on the ground. Accordingly, the radio resources become tight in the cell 120, so that the overall communication speed in the cell 120 may be lowered.

The communication control apparatus 200 of the present embodiment has a function of suppressing such lowering in the overall communication speed in the cell 120. The communication control apparatus 200 is configured to cause the user terminal 30 whose wireless quality is poor in a network environment in the cell 120 to be handed over to an adjacent cell formed by another flying body 100 or an adjacent cell formed by the wireless base station on the ground, thereby offloading the traffic and optimizing the radio resources of the cell 120 to improve the user throughput.

Figure 2:
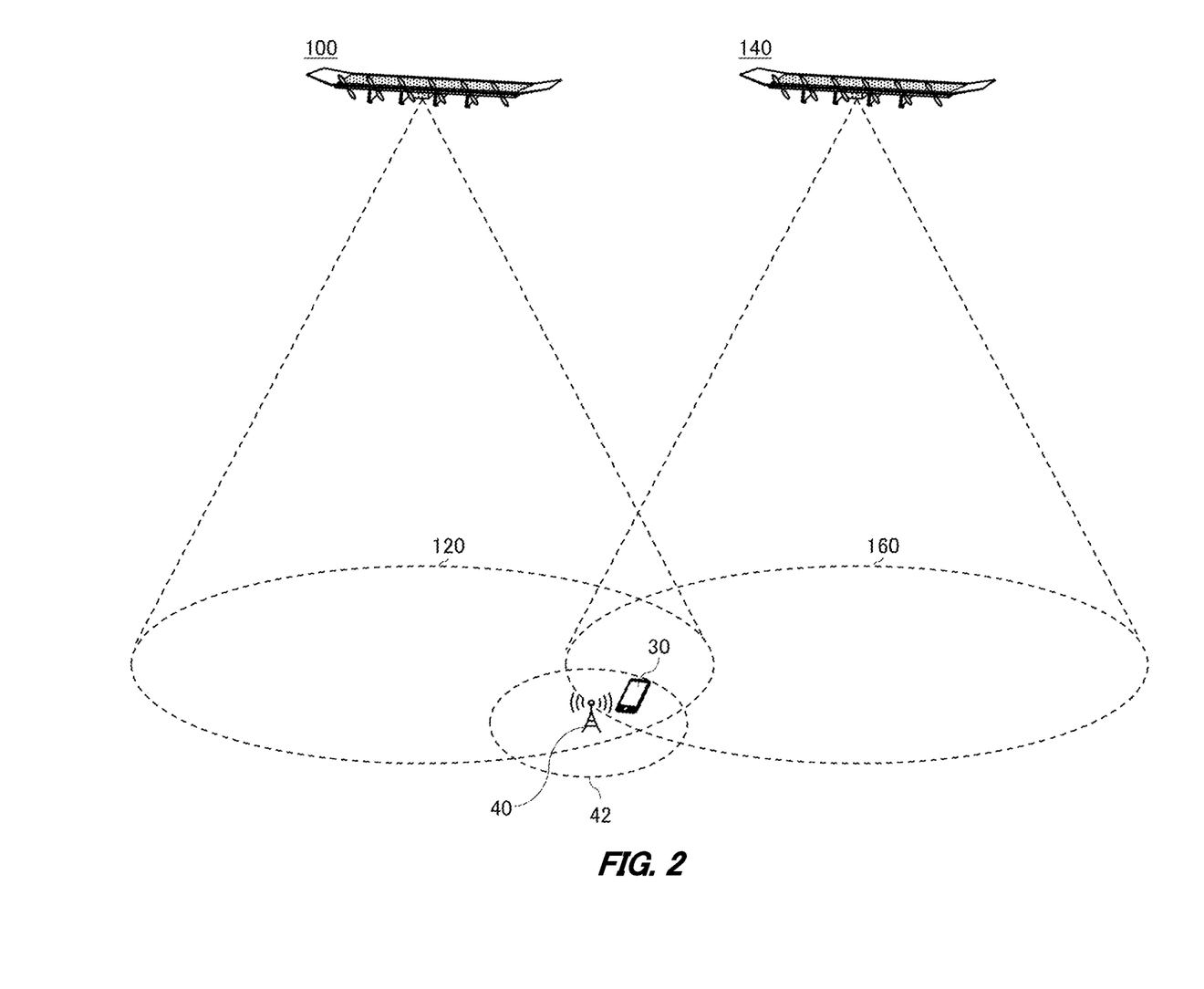
FIG. 2 illustrates handover control by a communication control apparatus 200.

FIG. 2 illustrates handover control by the communication control apparatus 200 mounted on the flying body 100. The communication control apparatus 200 is configured to cause the user terminal 30 whose wireless environment is poorer among a plurality of user terminals 30 to be handed over to another cell, in a situation where the plurality of user terminals 30 exists in the cell 120 and the radio resources of the cell 120 are tight. The description 'the user terminal 30 exists in the cell 120' may mean that the user terminal 30 is located in the cell 120 to establish wireless communication connection with the flying body 100. Note that, the situation where the user terminal 30 exists in the cell 120 may also be described as 'the user terminal 30 exists in the flying body 100'.

In FIG. 2, only the user terminal 30 of a handover target is shown, and the other user terminals 30 are not shown. The number of the user terminal 30 of a handover target is not limited to one, and may be any number. FIG. 2 exemplifies a case where a cell 160 of a flying body 140 and a cell 42 of a wireless base station 40 on the ground are present as adjacent cells.

The communication control apparatus 200 is configured to determine a cell of a handover destination of the user terminal 30, based on a frequency priority list in which priorities are each associated with each of a plurality of frequencies, for example. Table 1 described below is an example of the frequency priority list. In the example shown in Table 1, B41 has the highest priority, followed by B42, B1, B3 and B8. The priority may be able to be arbitrarily set and may also be able to be changed.

TABLE 1

| FREQUENCY | PRIORITY |
|---|---|
| B42 (3.5GHz) | 2 |
| B41 (2.5GHz) | 1 |
| B1 (2.1GHz) | 3 |
| B3 (1.7GHz) | 4 |
| B8 (900MHz) | 5 |
| ... | ... |

When the cell 42 is selected as a handover destination of the user terminal 30, for example, the communication control apparatus 200 controls the user terminal 30 to be handed over to the cell 42. The communication control apparatus 200 may be configured to control the user terminal 30 to be handed over to the cell 42 by using any well-known method. For example, the communication control apparatus 200 transmits a message (RRC Connection Release) for instructing opening of wireless connection, which includes idleModeMobilityControlInfo indicative of a priority of a cell to be reselected in which the priority of the cell 42 is set higher, to the user terminal 30. Thereby, the user terminal 30 can be handed over to the cell 42.

Figure 3:
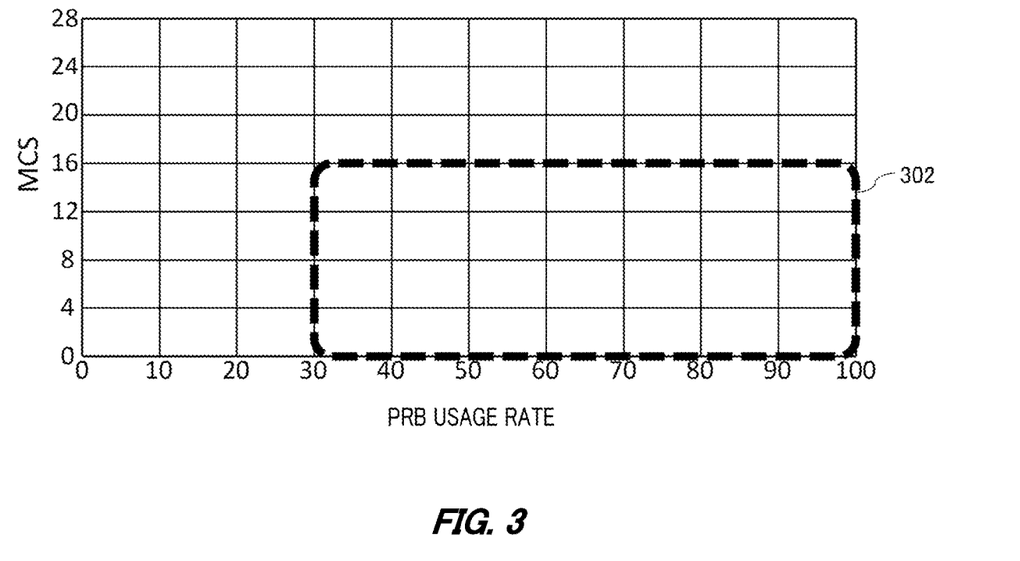
FIG. 3 illustrates an example of a condition of determining a user terminal 30 of an offload target.

FIG. 3 illustrates an example of a condition of determining the user terminal 30 of an offload target. The communication control apparatus 200 may be configured to determine the user terminal 30 of an offload target among the plurality of user terminals 30, based on a PRB usage rate of each of the plurality of user terminals 30 that exists in the flying body 100 and an MCS (Modulation and Coding Scheme) of each of the plurality of user terminals 30.

The PRB usage rate that is used for the determination may be a PRB usage rate of a downlink or a PRB usage rate of an uplink. The MCS that is used for the determination may be an MCS of a downlink or an MCS of an uplink. FIG. 3 exemplifies a case where MCS has 28 stages. However, the MCS is not limited thereto, and various MCS may be used.

The communication control apparatus 200 is configured to set a threshold value (which may also be referred to as a terminal resource threshold value) for comparison with the PRB usage rate and a threshold value (which may also be referred to as an MCS threshold value) for comparison with the MCS, thereby setting an offload target region 302.

The example shown in FIG. 3 shows a case where the terminal resource threshold value is 30% and the MCS threshold value is 16. The communication control apparatus 200 is configured to determine, as the user terminal 30 of an offload target, the user terminal 30 whose PRB usage rate is higher than the terminal resource threshold value and MCS is lower than the MCS threshold value, among the plurality of user terminals 30. Thereby, the user terminal 30 having a high communication load and a low wireless communication quality can be caused to be preferentially handed over, so that it is possible to optimize the radio resources of the cell 120.

The communication control apparatus 200 may also be configured to determine the user terminal 30 of an offload target, based on only the PRB usage rates of the plurality of user terminals 30. For example, the communication control apparatus 200 is configured to determine, as the user terminal 30 of an offload target, the user terminal 30 whose PRB usage rate is higher than the terminal resource threshold value, among the plurality of user terminals 30. Thereby, the user terminal 30 having a high communication load can be caused to be preferentially offloaded.

In addition, for example, the communication control apparatus 200 is configured to determine, as the user terminal 30 of an offload target, the user terminal 30 whose MCS is lower than the MCS threshold value, among the plurality of user terminals 30. Thereby, it is possible to preferentially offload the user terminal 30 having a low wireless communication quality.

Figure 4:
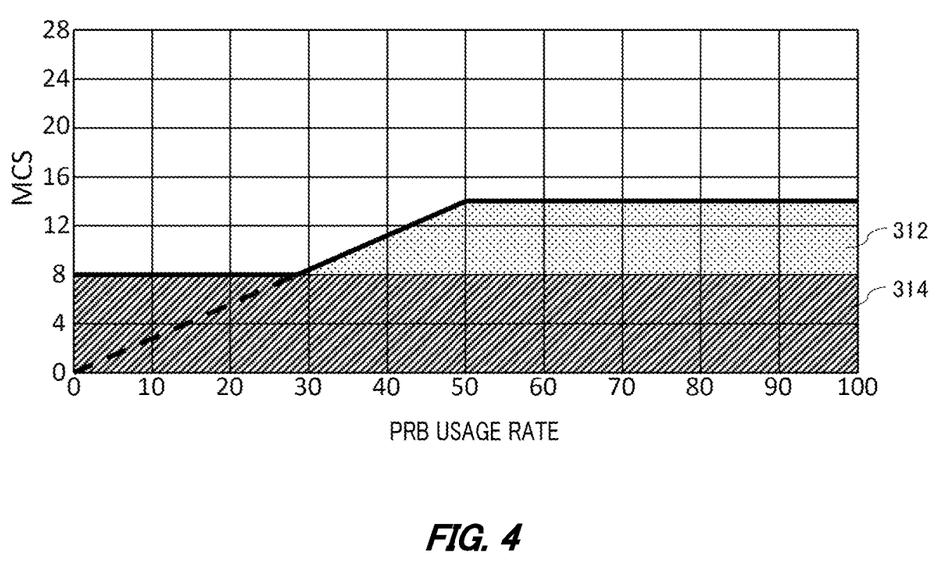
FIG. 4 illustrates an example of the condition of determining the user terminal 30 of an offload target.

FIG. 4 illustrates another example of the condition of determining the user terminal 30 of an offload target. The communication control apparatus 200 may be configured to determine, as an offload target, the user terminal 30, which is located in an offload target region 312 and an offload target region 314 shown in FIG. 4, among the plurality of user terminals 30. In this way, the communication control apparatus 200 can arbitrarily set the condition for determining the user terminal 30 of an offload target.

Figure 5:
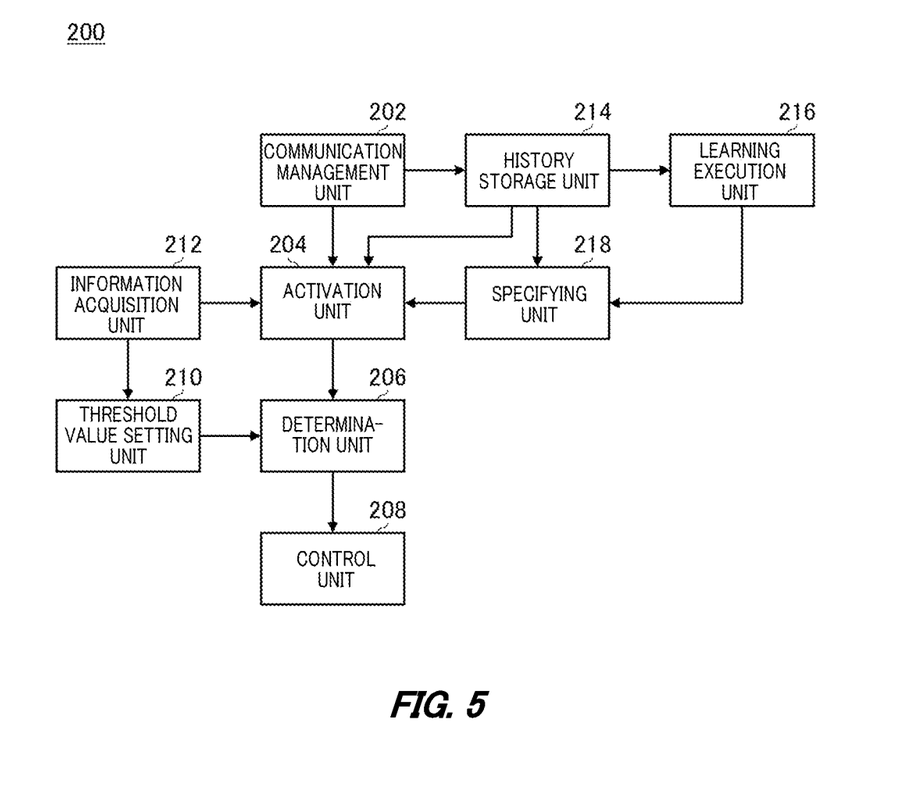
FIG. 5 schematically shows an example of a functional configuration of the communication control apparatus 200.

FIG. 5 schematically shows an example of a functional configuration of the communication control apparatus 200. The communication control apparatus 200 comprises a communication management unit 202, an activation unit 204, a determination unit 206, a control unit 208, a threshold value setting unit 210, an information acquisition unit 212, a history storage unit 214, a learning execution unit 216 and a specifying unit 218. Note that, it is not necessarily required for the communication control apparatus 200 to have all the configurations.

The communication management unit 202 is configured to manage communication of the user terminal 30 that exists in the flying body 100. The communication management unit 202 may also be configured to manage communication of the user terminal 30 relayed by the base station apparatus. In a case where the communication control apparatus 200 is formed integrally with the base station apparatus, the communication management unit 202 may be configured to relay communication of the user terminal 30.

The communication management unit 202 may be configured to manage PRB usage rates in the cell 120. The communication management unit 202 may also be configured to manage the PRB usage rate of each of the plurality of user terminals 30 that exists in the flying body 100. The communication management unit 202 may also be configured to manage the MCS of each of the plurality of user terminals 30 that exists in the flying body 100.

The activation unit 204 is configured to activate an offload function for causing the user terminal 30 that exists in the cell 120 of the flying body 100 to be handed over to another cell, in response to satisfaction of a predetermined condition The activation unit 204 is configured to activate the offload function when the PRB usage rate in the cell 120 of the flying body 100 is higher than a predetermined threshold value (which may also be referred to as 'cell resource threshold value'), for example.

The determination unit 206 is configured to determine the user terminal 30 of an offload target, which is to be offloaded, among the plurality of user terminals 30 that exists in the flying body 100 and a cell of an offload destination when the offload function is being activated. The determination unit 206 is configured to determine the user terminal 30 of an offload target and a cell of an offload destination, based on the neighbor cell list of the cell 120 of the flying body 100, the frequency priority list, the PRB usage rate of each of the plurality of user terminals 30 that exists in the flying body 100, and the MCS of the plurality of user terminals 30 that exists in the flying body 100, for example.

The determination unit 206 is configured to determine the user terminal 30 of an offload target, based on the PRB usage rate of each of the plurality of user terminals 30 that exists in the flying body 100 and the MCS of the plurality of user terminals 30, for example. For example, the determination unit 206 is configured to determine, as the user terminal 30 of an offload target, the user terminal 30 whose PRB usage rate is higher than the predetermined terminal resource threshold value, among the plurality of user terminals 30. In addition, for example, the determination unit 206 is configured to determine, as the user terminal 30 of an offload target, the user terminal 30 whose MCS is lower than the predetermined MCS threshold value, among the plurality of user terminals 30. In addition, for example, the determination unit 206 is configured to determine, as the user terminal 30 of an offload target, the user terminal 30 whose PRB usage rate is higher than the terminal resource threshold value and MCS is lower than the MCS threshold value, among the plurality of user terminals 30.

The control unit 208 is configured to cause the user terminal 30 of an offload target to be handed over to the cell of an offload destination determined by the determination unit 206. The control unit 208 is configured to cause the user terminal 30 of an offload target to be handed over to the cell of an offload destination by using any well-known method, for example. For example, the control unit 208 transmits RRC Connection Release, which includes re-idleModeMobilityControlInfo in which the priority of the cell of the offload destination is set higher, to the user terminal 30.

The threshold value setting unit 210 is configured to set the terminal resource threshold value. The threshold value setting unit 210 is configured to set the terminal resource threshold value according to an instruction of a service provider who provides wireless communication service by the flying body 100, before the flying body 100 starts flying, for example. In a case where the flying body 100 forms a multi-cell constituted by a plurality of cells by irradiating a plurality of beams toward the ground, the threshold value setting unit 210 may be configured to set the terminal resource threshold value for each of the plurality of cells. The threshold value setting unit 210 may be an example of the first threshold value setting unit.

The threshold value setting unit 210 is configured to set the MCS threshold value. The threshold value setting unit 210 is configured to set the MCS threshold value according to an instruction of a service provider who provides wireless communication service by the flying body 100, before the flying body 100 starts flying, for example. In a case where the flying body 100 forms a multi-cell constituted by a plurality of cells by irradiating a plurality of beams toward the ground, the threshold value setting unit 210 may be configured to set the MCS threshold value for each of the plurality of cells.

The threshold value setting unit 210 is configured to set the cell resource threshold value. The threshold value setting unit 210 is configured to set the cell resource threshold value according to an instruction of a service provider who provides wireless communication service by the flying body 100, before the flying body 100 starts flying, for example. In a case where the flying body 100 forms a multi-cell constituted by a plurality of cells by irradiating a plurality of beams toward the ground, the threshold value setting unit 210 may be configured to set the cell resource threshold value for each of the plurality of cells. The threshold value setting unit 210 may be an example of the second threshold value setting unit.

The information acquisition unit 212 is configured to acquire a variety of information. The information acquisition unit 212 may be configured to acquire ground area-related information relating to a ground area that is covered by the cell 120, while the flying body 100 is flying. The information acquisition unit 212 is configured to receive the ground area-related information from the management apparatus 400, for example.

The threshold value setting unit 210 may be configured to refer to the ground area-related information acquired by the information acquisition unit 212, and to set the terminal resource threshold value and the MCS threshold value, based on the situation of the ground area that is covered by the cell 120. For example, in an event holding situation such as a concert at which many people can gather in the ground area that is covered by the cell 120, the threshold value setting unit 210 decreases the terminal resource threshold value and increases the MCS threshold value. Thereby, in a case where tightness of the cell 120 is expected, the user terminal 30 can be easily offloaded, so that it is possible to reduce lowering in the overall communication speed due to the tightness.

In addition, for example, in a case where the mobile network is not arranged in the ground area that is covered by the cell 120, the threshold value setting unit 210 increases the terminal resource threshold value and decreases the MCS threshold value. Thereby, it is possible to reduce a possibility that unnecessary processing is executed, such as a case where although it is intended to offload the user terminal 30, an offload destination is not found.

In addition, for example, in a case where the communication load of the mobile network on the ground is lower than a predetermined threshold value in the ground area that is covered by the cell 120, the threshold value setting unit 210 decreases the terminal resource threshold value and increases the MCS threshold value. Thereby, it is possible to actively offload the user terminal 30 that exists in the flying body 100 to the mobile network on the ground.

In addition, for example, in a case where the communication load of the mobile network on the ground is higher than the predetermined threshold value in the ground area that is covered by the cell 120, the threshold value setting unit 210 increases the terminal resource threshold value and decreases the MCS threshold value. Thereby, it is possible to suppress occurrence of a situation where the offload of the user terminal 30 that exists in the flying body 100 to the mobile network on the ground further increases the communication load of the mobile network on the ground.

In a case where the flying body 100 forms a multi-cell constituted by a plurality of cells, the threshold value setting unit 210 may be configured to refer to the ground area-related information acquired by the information acquisition unit 212 and to set the terminal resource threshold value and the MCS threshold value for each of the plurality of cells, based on situations of the ground areas each covered by each of the plurality of cells. For example, the threshold value setting unit 210 decreases the terminal resource threshold value and increases the MCS threshold value only for a cell where an event such as a concert at which many people can gather is held in the covered ground area, among the plurality of cells. In addition, for example, the threshold value setting unit 210 increases the terminal resource threshold value and decreases the MCS threshold value only for a cell where the mobile network on the ground is not arranged in the covered ground area, among the plurality of cells. Further, for example, the threshold value setting unit 210 increases the terminal resource threshold value and decreases the MCS threshold value for a cell where the communication load of the mobile network on the ground in the covered ground area is higher than a predetermined threshold value and decreases the terminal resource threshold value and increases the MCS threshold value for a cell where the communication load of the mobile network on the ground in the covered ground area is lower than the predetermined threshold value, among the plurality of cells.

The threshold value setting unit 210 may be configured to refer to the ground area-related information acquired by the information acquisition unit 212, and to set the cell resource threshold value, based on the situation of the ground area that is covered by the cell 120. For example, in a case where an event such as a concert at which many people can gather is held in the ground area that is covered by the cell 120, the threshold value setting unit 210 decreases the cell resource threshold value. Thereby, it is possible to facilitate activation of the offload function when tightness of the cell 120 is expected.

In addition, for example, in a case where the mobile network is not arranged in the ground area that is covered by the cell 120, the threshold value setting unit 210 increases the cell resource threshold value. Thereby, it is possible to reduce a possibility that unnecessary processing is executed, such as a case where although it is intended to offload the user terminal 30, an offload destination is not found.

In addition, for example, in a case where the communication load of the mobile network on the ground is lower than the predetermined threshold value in the ground area that is covered by the cell 120, the threshold value setting unit 210 decreases the cell resource threshold value. Thereby, it is possible to facilitate activation of the offload function in a situation where the user terminal 30 can be accepted by the mobile network on the ground.

In addition, for example, in a case where the communication load of the mobile network on the ground is higher than the predetermined threshold value in the ground area that is covered by the cell 120, the threshold value setting unit 210 increases the cell resource threshold value. Thereby, it is possible to make it difficult to activate the offload function in a situation where it is difficult to accept the user terminal 30 by the mobile network on the ground.

In a case where the flying body 100 forms a multi-cell constituted by a plurality of cells, the threshold value setting unit 210 may be configured to refer to the ground area-related information acquired by the information acquisition unit 212 and to set the cell resource threshold value for each of the plurality of cells, based on situations of the ground areas each covered by each of the plurality of cells. For example, the threshold value setting unit 210 decreases the cell resource threshold value only for a cell where an event such as a concert at which many people can gather is held in the covered ground area, among the plurality of cells. In addition, for example, the threshold value setting unit 210 increases the cell resource threshold value only for a cell where the mobile network on the ground is not arranged in the covered ground area, among the plurality of cells. Further, for example, the threshold value setting unit 210 increases the cell resource threshold value for a cell where the communication load of the mobile network on the ground in the covered ground area is higher than the predetermined threshold value and decreases the cell resource threshold value for a cell where the communication load of the mobile network on the ground in the covered ground area is lower than the predetermined threshold value, among the plurality of cells.

The history storage unit 214 is configured to store a history of a position of the flying body 100, a date and time and the PRB usage rate in the cell 120 of the flying body 100. The history storage unit 214 may also be configured to store a position of the flying body 100 acquired from the communication management unit 202, a date and time and the PRB usage rate in the cell 120 of the flying body 100, as the history.

The activation unit 204 may be configured to determine a condition in advance, based on the history stored in the history storage unit 214, and to activate the offload function, in response to satisfaction of the predetermined condition. The activation unit 204 is configured to activate the offload function when it is estimated based on the history that the PRB usage rate in the cell 120 of the flying body 100 increases as the flying body 100 advances in a flying direction, from the date and time at which the flying body 100 is flying and the flying direction of the flying body 100, for example.

The learning execution unit 216 is configured to generate a learning model by executing a learning on the history stored in the history storage unit 214. For example, the learning execution unit 216 is configured to learn a relationship between a position of the flying body 100 and a date and time, which are included in the history at a time when the flying body 100 flied a predetermined flying route, and the PRB usage rate in the cell 120 of the flying body 100, thereby generating a learning model for outputting the PRB usage rate in the cell 120 of the flying body 100 from the position of the flying body 100 and the date and time.

In a case where the flying body 100 flies a predetermined flying route, the specifying unit 218 is configured to specify a position of the flying body 100 and a date and time of the flying route, at which the PRB usage rate becomes higher than a predetermined threshold value, by using the learning model generated by the learning execution unit 216. The activation unit 204 may be configured to activate the offload function before the flying body 100 reaches the position specified by the specifying unit 218 at the date and time specified by the specifying unit 218, when the flying body 100 flies the flying route. Thereby, while the flying body 100 flies the flying route, when a probability that the PRB usage rate in the cell 120 of the flying body 100 will be increased increases, the offload function can be activated before the PRB usage rate is actually increased.

Figure 6:
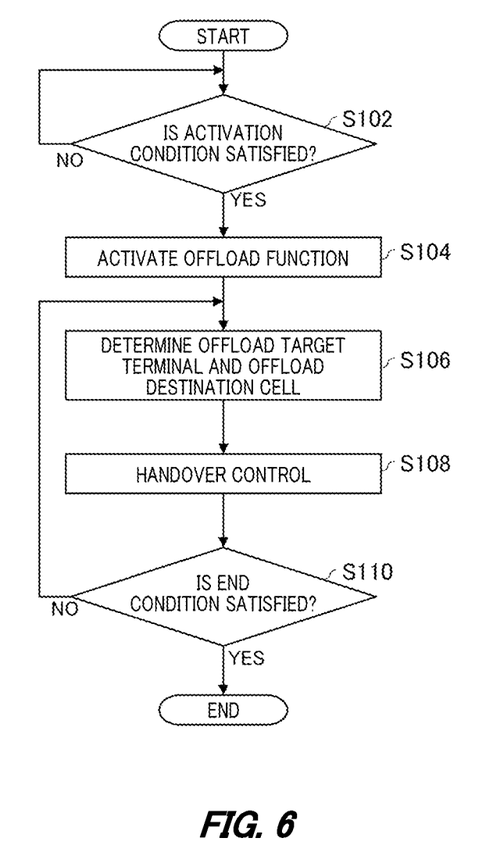
FIG. 6 schematically shows an example of a processing flow by the communication control apparatus 200.

FIG. 6 schematically shows an example of a processing flow by the communication control apparatus 200. Here, a state where the offload function is not activated is described as a start state.

In step (step may be described as S) 102, the activation unit 204 determines whether a start-up condition of the offload function is satisfied. When it is determined that the condition is satisfied, the processing proceeds to S104. In S104, the activation unit 204 activates the offload function.

In S106, the determination unit 206 determines, from the plurality of user terminals 30 that exists in the flying body 100, the user terminal 30 of an offload target (which may also be referred to as 'offload target terminal') and a cell of an offload destination (which may also be referred to as 'offload destination cell')

Figure 7:
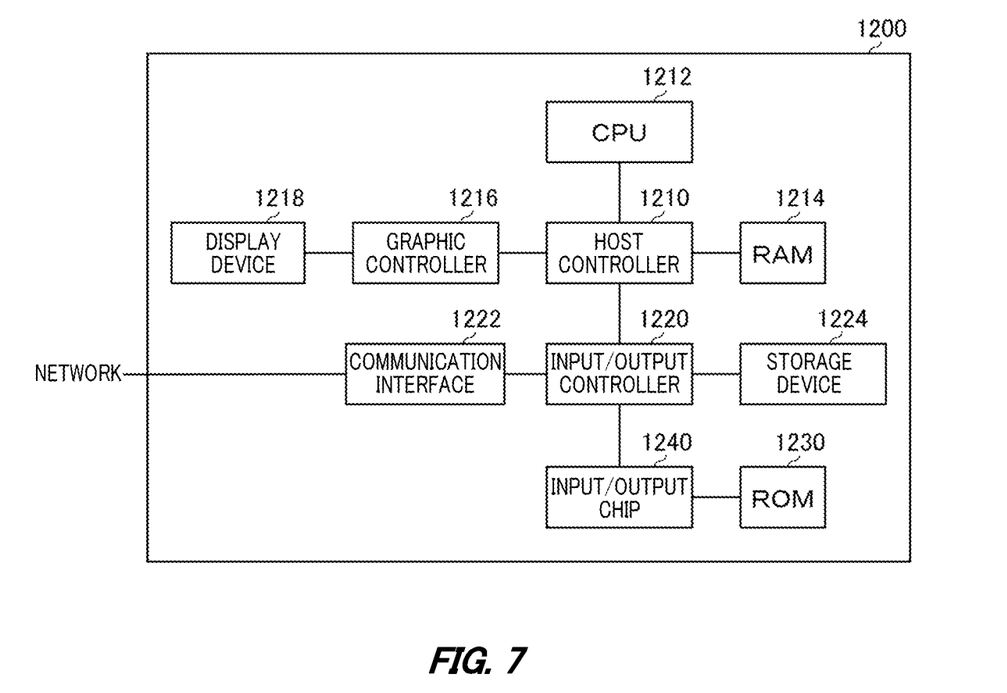
FIG. 7 schematically shows an example of a hardware configuration of a computer 1200 functioning as the communication control apparatus 200.

FIG. 7 schematically shows an example of a hardware configuration of a computer 1200 functioning as the communication control apparatus 200. A program that is installed in the computer 1200 can cause the computer 1200 to function as one or more sections of the apparatus of the present embodiment or cause the computer 1200 to execute operations associated with the apparatus of the present embodiment or the one or more sections, and/or cause the computer 1200 to execute the method of the present embodiment or steps thereof. Such program may be executed by a CPU 1212 so as to cause the computer 1200 to execute certain operations associated with some or all of the blocks of flowcharts and block diagrams described herein.

The computer 1200 according to the present embodiment includes a CPU 1212, a RAM 1214, and a graphic controller 1216, which are mutually connected by a host controller 1210. The computer 1200 also includes input/output units such as a communication interface 1222, a storage device drive 1224 and an IC card drive, which are connected to the host controller 1210 via an input/output controller 1220. The storage device 1224 may be a hard disk drive, a solid state drive and the like. The computer 1200 also includes legacy input/output units such as a ROM 1230 and a keyboard, which are connected to the input/output controller 1220 via an input/output chip 1240.

The CPU 1212 is configured to operate according to programs stored in the ROM 1230 and the RAM 1214, thereby controlling each unit. The graphic controller 1216 is configured to acquire image data generated by the CPU 1212 on a frame buffer or the like provided in the RAM 1214 or in itself, and to cause the image data to be displayed on a display device 1218.

The communication interface 1222 is configured to communicate with other electronic devices via a network. The storage device 1224 is configured to store programs and data that are used by the CPU 1212 within the computer 1200. The IC card drive is configured to read programs and data from an IC card, and/or to write programs and data into the IC card.

The ROM 1230 is configured to store therein a boot program or the like that is executed by the computer 1200 at the time of activation, and/or a program depending on the hardware of the computer 1200. The input/output chip 1240 may also be configured to connect various input/output units to the input/output controller 1220 via a USB port, a parallel port, a serial port, a keyboard port, a mouse port and the like.

A program is provided by a computer-readable storage medium such as an IC card. The program is read from the computer-readable storage medium, is installed into the storage device 1224, the RAM 1214 or the ROM 1230, which are also examples of the computer-readable storage medium, and is executed by the CPU 1212. The information processing described in these programs is read into the computer 1200, resulting in cooperation between a program and the above-mentioned various types of hardware resources. An apparatus or method may be constituted by realizing the operation or processing of information in accordance with the usage of the computer 1200.

For example, when communication is performed between the computer 1200 and an external device, the CPU 1212 may execute a communication program loaded onto the RAM 1214 to instruct communication processing to the communication interface 1222, based on the processing described in the communication program. The communication interface 1222, under control of the CPU 1212, reads transmission data stored on a transmission buffer region provided in a recording medium such as the RAM 1214, the storage device 1224, or the IC card, and transmits the read transmission data to a network or writes reception data received from the network to a reception buffer region or the like provided on the recording medium.

In addition, the CPU 1212 may be configured to cause all or a necessary portion of a file or a database, which has been stored in an external recording medium such as the storage device 1224, the IC card and the like, to be read into the RAM 1214, thereby executing various types of processing on the data on the RAM 1214. The CPU 1212 may be configured to write back the processed data to the external recording medium.

Various types of information, such as various types of programs, data, tables, and databases, may be stored in the recording medium to undergo information processing. The CPU 1212 may also be configured to execute various types of processing on the data read from the RAM 1214, which includes various types of operations, processing of information, condition judging, conditional branching, unconditional branching, search/replacement of information and the like described in the present disclosure and designated by an instruction sequence of programs, and to write the result back to the RAM 1214. The CPU 1212 may also be configured to search for information in a file, a database, etc., in the recording medium. For example, when a plurality of entries, each having an attribute value of a first attribute associated with an attribute value of a second attribute, is stored in the recording medium, the CPU 1212 may search for an entry matching the condition whose attribute value of the first attribute is designated, from the plurality of entries, and read the attribute value of the second attribute stored in the entry, thereby obtaining the attribute value of the second attribute associated with the first attribute satisfying the predetermined condition.

The above-described program or software modules may be stored in the computer-readable storage medium on or near the computer 1200. In addition, a recording medium such as a hard disk or a RAM provided in a server system connected to a dedicated communication network or the Internet can be used as the computer-readable storage medium, thereby providing the programs to the computer 1200 via the network.

In the present embodiment, blocks of the flowcharts and the block diagrams may represent steps of processes in which operations are executed or sections of apparatuses responsible for performing operations. Certain steps and sections may be implemented by dedicated circuitry, programmable circuitry supplied with computer-readable instructions stored on computer-readable storage media, and/or processors supplied with computer-readable instructions stored on computer-readable storage media. Dedicated circuitry may include digital and/or analog hardware circuits and may include integrated circuits (IC) and/or discrete circuits. Programmable circuitry may include, for example, reconfigurable hardware circuits comprising logical AND, OR, XOR, NAND, NOR, and other logical operations, flip-flops, registers, and memory elements, such as field-programmable gate arrays (FPGA), programmable logic arrays (PLA), etc.

Computer-readable storage media may include any tangible device that can store instructions for execution by a suitable device, such that the computer-readable storage medium having instructions stored therein comprises an article of manufacture including instructions which can be executed to create means for performing operations specified in the flowcharts or block diagrams. Examples of computer-readable storage media may include an electronic storage medium, a magnetic storage medium, an optical storage medium, an electromagnetic storage medium, a semiconductor storage medium, etc. More specific examples of computer-readable storage media may include a floppy (registered trademark) disk, a diskette, a hard disk, a random access memory (RAM), a read-only memory (ROM), an erasable programmable read-only memory (EPROM or flash memory), an electrically erasable programmable read-only memory (EEPROM), a static random access memory (SRAM), a compact disc read-only memory (CD-ROM), a digital versatile disk (DVD), a BLU-RAY (registered trademark) disc, a memory stick, an integrated circuit card, etc.

Computer-readable instructions may include assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, JAVA (registered trademark), C++, etc., and conventional procedural programming languages, such as the "C" programming language or similar programming languages.

Computer-readable instructions may be provided to a processor of a general purpose computer, a special purpose computer, or other programmable data processing apparatus, or to programmable circuitry, locally or via a local area network (LAN), wide area network (WAN) such as the Internet, etc., so that the processor of the general purpose computer, special purpose computer, or other programmable data processing apparatus, or the programmable circuitry performs the computer-readable instructions to create means for performing operations specified in the flowcharts or block diagrams. Examples of processors include computer processors, processing units, microprocessors, digital signal processors, controllers, microcontrollers, etc.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

20: network, 22: gateway, 30: user terminal, 40: wireless base station, 42: cell, 100: flying body, 102: main body, 104: main wing, 106: propeller, 108: skid, 110: wheel, 112: solar cell panel, 120: cell, 140: flying body, 160: cell, 200: communication control apparatus, 202: communication management unit, 204: activation unit, 206: determination unit, 208: control unit, 210: threshold value setting unit, 212: information acquisition unit, 214: history storage unit, 216: learning execution unit, 218: specifying unit, 302: offload target region, 312: offload target region, 314: offload target region, 400: management apparatus, 1200: computer, 1210: host controller, 1212: CPU, 1214: RAM, 1216: graphic controller, 1218: display device, 1220: input/output controller, 1222: communication interface, 1224: storage device, 1230: ROM, 1240: input/output chip

What is claimed is:

1. A communication control apparatus configured to control communication of a flying body configured to form a cell by irradiating a beam toward the ground to provide wireless communication service for a user terminal in the cell, the communication control apparatus comprising:
   an activation unit configured to activate an offload function for causing a user terminal that exists in the cell of the flying body to be handed over to another cell, in response to satisfaction of a predetermined condition;
   a determination unit configured to determine a user terminal of an offload target to be offloaded among a plurality of user terminals that exists in the cell of the flying body and a cell of an offload destination, based on a neighbor cell list of the cell of the flying body, a frequency priority list in which priorities are each associated with each of a plurality of frequencies, a radio resource usage rate of each of the plurality of user terminals, and an MCS of each of the plurality of user terminals, when the offload function is being activated; and
   a control unit configured to cause the user terminal of the offload target to be handed over to the cell of the offload destination.

2. The communication control apparatus according to claim 1, wherein
   the determination unit is configured to determine the user terminal of the offload target, based on the radio resource usage rate of each of the plurality of user terminals, and the MCS of each of the plurality of user terminals.

3. The communication control apparatus according to claim 2, wherein
   the determination unit is configured to determine, as the user terminal of the offload target, a user terminal having the radio resource usage rate higher than a predetermined terminal resource threshold value and the MCS lower than an MCS threshold value, among the plurality of user terminals.

4. The communication control apparatus according to claim 3, wherein
   the flying body is configured to form a multi-cell constituted by a plurality of cells by irradiating a plurality of beams toward the ground, and
   the communication control apparatus comprises a first threshold value setting unit configured to set the terminal resource threshold value and the MCS threshold value for each of the plurality of cells.

5. The communication control apparatus according to claim 4, wherein
   the first threshold value setting unit is configured to set the terminal resource threshold value and the MCS threshold value for each of the plurality of cells, based on situations of ground areas each covered by each of the plurality of cells.

6. The communication control apparatus according to claim 3, wherein
   the determination unit is configured to determine the cell of the offload destination, based on the neighbor cell list and the frequency priority list.

7. The communication control apparatus according to claim 3, wherein
   the activation unit is configured to activate the offload function when a radio resource usage rate in the cell of the flying body is higher than a predetermined cell resource threshold value.

8. The communication control apparatus according to claim 2, wherein
   the determination unit is configured to determine the cell of the offload destination, based on the neighbor cell list and the frequency priority list.

9. The communication control apparatus according to claim 2, wherein
   the activation unit is configured to activate the offload function when a radio resource usage rate in the cell of the flying body is higher than a predetermined cell resource threshold value.

10. The communication control apparatus according to claim 1, wherein
    the determination unit is configured to determine the cell of the offload destination, based on the neighbor cell list and the frequency priority list.

11. The communication control apparatus according to claim 1, wherein
    the activation unit is configured to activate the offload function when the radio resource usage rate in the cell of the flying body is higher than a predetermined cell resource threshold value.

12. The communication control apparatus according to claim 11, wherein
    the flying body is configured to form a multi-cell constituted by a plurality of cells by irradiating a plurality of beams toward the ground, and
    the communication control apparatus comprises a second threshold value setting unit configured to set the cell resource threshold value for each of the plurality of cells.

13. The communication control apparatus according to claim 12, wherein
    the second threshold value setting unit is configured to set the cell resource threshold value for each of the plurality of cells, based on situations of ground areas each covered by each of the plurality of cells.

14. The communication control apparatus according to claim 13, further comprising a history storage unit configured to store a history of a position of the flying body, a date and time, and a radio resource usage rate in the cell of the flying body, wherein
    the activation unit is configured to determine the predetermined condition based on the history and to activate the offload function, in response to satisfaction of the predetermined condition.

15. The communication control apparatus according to claim 12, further comprising a history storage unit configured to store a history of a position of the flying body, a date and time, and a radio resource usage rate in the cell of the flying body, wherein
the activation unit is configured to determine the predetermined condition based on the history and to activate the offload function, in response to satisfaction of the predetermined condition.

16. The communication control apparatus according to claim 11, further comprising a history storage unit configured to store a history of a position of the flying body, a date and time, and the radio resource usage rate in the cell of the flying body, wherein
the activation unit is configured to determine the predetermined condition based on the history and to activate the offload function, in response to satisfaction of the predetermined condition.

17. The communication control apparatus according to claim 16, wherein
the flying body is configured to fly a predetermined flying route,
the communication control apparatus comprises a specifying unit configured to specify the position of the flying body and the date and time of the flying route, at which the radio resource usage rate becomes higher than a predetermined threshold value, by using a learning model derived by learning a relationship between the position of the flying body and the date and time and the radio resource usage rate in the cell of the flying body, which are included in the history, and
the activation unit is configured to activate the offload function before the flying body reaches the position specified by the specifying unit at the date and time specified by the specifying unit, when the flying body flies the flying route.

18. A communication system comprising:
the communication control apparatus according to claim 1; and
the flying body.

19. A non-transitory computer-readable storage medium having recorded thereon a program that causes a computer to function as:
a communication control apparatus configured to control communication of a flying body configured to form a cell by irradiating a beam toward the ground to provide wireless communication service for a user terminal in the cell, and comprising:
an activation unit configured to activate an offload function for causing a user terminal that exists in the cell of the flying body to be handed over to another cell in response to satisfaction of a predetermined condition;
a determination unit configured to determine a user terminal of an offload target to be offloaded among a plurality of user terminals that exists in the cell of the flying body and a cell of an offload destination, based on a neighbor cell list of the cell of the flying body, a frequency priority list in which priorities are each associated with each of a plurality of frequencies, a radio resource usage rate of each of the plurality of user terminals, and an MCS of each of the plurality of user terminals, when the offload function is being activated; and
a control unit configured to hand over the user terminal of the offload target to the cell of the offload destination.

20. A communication control method that is executed by a communication control apparatus configured to control communication of a flying body configured to form a cell by irradiating a beam toward the ground to provide wireless communication service for a user terminal in the cell, the communication control method comprising:
activating an offload function for causing a user terminal that exists in the cell of the flying body to be handed over to another cell in response to satisfaction of a predetermined condition;
determining a user terminal of an offload target to be offloaded among a plurality of user terminals that exists in the cell of the flying body and a cell of an offload destination, based on a neighbor cell list of the cell of the flying body, a frequency priority list in which priorities are each associated with each of a plurality of frequencies, a radio resource usage rate of each of the plurality of user terminals, and an MCS of each of the plurality of user terminals; and
handing over the user terminal of the offload target to the cell of the offload destination.

* * * * *